(12) United States Patent
Saeki

(10) Patent No.: US 10,131,189 B2
(45) Date of Patent: Nov. 20, 2018

(54) PNEUMATIC TIRE

(71) Applicant: BRIDGESTONE CORPORATION, Tokyo (JP)

(72) Inventor: Kentaro Saeki, Tokorozawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 199 days.

(21) Appl. No.: 14/787,286

(22) PCT Filed: May 9, 2014

(86) PCT No.: PCT/JP2014/002474
§ 371 (c)(1),
(2) Date: Oct. 27, 2015

(87) PCT Pub. No.: WO2014/207981
PCT Pub. Date: Dec. 31, 2014

(65) Prior Publication Data
US 2016/0114630 A1    Apr. 28, 2016

(30) Foreign Application Priority Data

Jun. 24, 2013  (JP) ................................. 2013-131763

(51) Int. Cl.
*B60C 11/12* (2006.01)
*B60C 11/03* (2006.01)

(52) U.S. Cl.
CPC ...... *B60C 11/1218* (2013.01); *B60C 11/0327* (2013.01); *B60C 2011/0334* (2013.01);
(Continued)

(58) Field of Classification Search
CPC . B60C 11/00; B60C 11/1218; B60C 11/0327; B60C 11/12; B60C 11/1204; B60C 11/1259; B60C 11/1263; B60C 2011/0358; B60C 2011/036; B60C 2011/0367; B60C 2011/0369;
(Continued)

(56) References Cited

U.S. PATENT DOCUMENTS

| 5,350,001 A | 9/1994 | Beckmann et al. |
| 6,116,310 A | 9/2000 | Shinohara |

(Continued)

FOREIGN PATENT DOCUMENTS

| CN | 101314318 A | 12/2008 |
| CN | 102015331 A | 4/2011 |

(Continued)

OTHER PUBLICATIONS

Jul. 22, 2014 International Search Report issued in International Patent Application No. PCT/JP2014/002474.

*Primary Examiner* — Robert C Dye
*Assistant Examiner* — Sedef E Paquette
(74) *Attorney, Agent, or Firm* — Oliff PLC

(57) ABSTRACT

A pneumatic tire includes: a plurality of land portions; and in at least one land portion of the plurality of land portions, a sipe extending in the tread width direction, of which ends open at the circumferential grooves or the tread ends. The sipe has at least one bent portion extending continuously in the extending direction of the sipe from one of the end regions of the sipe to the other end region in the depth direction of the sipe. The at least one bent portion is located on the outer side in the tire radial direction in the center region than in the end regions.

8 Claims, 4 Drawing Sheets

(52) U.S. Cl.
CPC ............... *B60C 2011/0341* (2013.01); *B60C 2011/1209* (2013.01)

(58) Field of Classification Search
CPC ..... B60C 2011/1209; B60C 2011/1227; B60C 11/1222; B29D 2030/0613
USPC ............... 152/209.1, 209.18, 209.21, 209.25
See application file for complete search history.

(56) References Cited

U.S. PATENT DOCUMENTS

| | | |
|---|---|---|
| 2008/0295937 A1 | 12/2008 | Ohashi |
| 2011/0048602 A1 | 3/2011 | Hayashi |
| 2012/0180920 A1 | 7/2012 | Nagayasu |

FOREIGN PATENT DOCUMENTS

| | | |
|---|---|---|
| CN | 102596595 A | 7/2012 |
| DE | 102008024983 A1 | 12/2008 |
| EP | 2279882 A1 | 2/2011 |
| JP | H10-86612 A | 4/1998 |
| JP | 2007-045316 A | 2/2007 |
| JP | 2008-296613 A | 12/2008 |
| JP | 2009-262829 A | 11/2009 |
| JP | 2010-125977 A | 6/2010 |
| JP | 2010-143377 A | 7/2010 |
| JP | 2012-162247 A | 8/2012 |

PNEUMATIC TIRE

TECHNICAL FIELD

This disclosure relates to a pneumatic tire.

BACKGROUND

During braking and driving, the shear force applied to the tread of a pneumatic tire is increased due to an input of force from the road surface. In particular, in order to improve wear resistance, it is important to reduce the shear force at the time of "kick-out".

In this respect, for example, JP 2010-125977 A (PTL 1) proposes a technique of optimizing the arrangement of blocks to generate shear force from the time of "step-in" during braking and driving and reducing the shear force applied to the tread at the time of kick-out, thereby improving the wear resistance.

CITATION LIST

Patent Literature

PTL 1. JP 2010-125977 A

SUMMARY

Technical Problem

The technique described in PTL 1 has a great effect obtained by forming narrow grooves; however, the formation of the narrow grooves creates a trade-off between the foregoing effect and reduction in the rigidity of the blocks, resulting in a problem in that not many grooves can be formed.

In attempts to solve the above problem, it could be helpful to provide a pneumatic tire with improved wear resistance.

Solution to Problem

The inventor made various studies to solve the above problem. Accordingly, he found that the formation of so-called three-dimensional sipes in land portions can generate high shear force from the time of step-in due to the engagement between the walls of the sipes when the pneumatic tire is subjected to braking, force and driving force. Meanwhile, he also found that the formation of sipes reduces the rigidity of the land portions, which would result in the deteriorated wear resistance.

This being the case, he made attempts to both improve the rigidity using the deformation constraint due to the engagement between the walls of sipes and generate the above-described shear force from the time of step-in. Consequently, the inventor found that changing the positions of bent portions that extend continuously in the direction of the extension of the sipes, in the direction of the depth of the sipes, depending on the direction of the extension of the sipes was effective.

Specifically, another finding is that the above described generation of the shear force from the time of step-in effectively makes the engagement between the sipe walls at center portions of the land portions, whereas in order to improve the rigidity, constraining the deformation in the vicinity of the ends of the land portions is effective; and placing the above bent portions at shallower positions in the direction of the depth of the sipes at center portions of the land portions than on the end sides thereof is also effective.

This disclosure is based on the above findings and we provide a pneumatic tire having, the following features.

We provide a pneumatic tire comprising: in a tread surface, a plurality of land portions partitioned by one or more circumferential grooves extending in the tread circumferential direction or by the circumferential grooves and the tread ends; and in at least one land portion of the plurality of land portions, a sipe extending in the tread width direction, of which ends open at the circumferential grooves or the tread ends. Provided that of the area in which the sipe extend, two areas covering ⅙ of the extension length of the sipe from both ends of the sipe are end regions: two areas covering ⅙ of the extension length of the sipe that are adjacent to the two end regions are intermediate regions, and an area covering ⅓ of the extension length of the sipe which is sandwiched between the two intermediate regions is a center region. The sipe has at least one bent portion extending continuously in the extending direction of the sipe from one of the end regions of the sipe to the other end region in the depth direction of the sipe. The at least one bent portion is located on the outer side in the tire radial direction in the center region than in the end regions. Thus, the wear resistance of the tire can be improved due to both the effect in improving, the rigidity of the land portions and the effect in increasing the shear force at the time of kick-out. Here, "sipe" refers to a thin slit which is formed inside a land portion by cutting its surface and can he closed at the time of grounding. The width of the opening of the sipe in the tread surface may be, but not limited to, for example, 2 mm or less. Further, "sipe extending in the tread width direction" may refer to not only a sipe extending in the tread width direction but also a sipe extending at an angle to the tread width direction. The term "positions of bent portions" refers to the average positions of the portions of the bent portions which have the maximum width in the tire radial direction in the regions (center region, intermediate regions, and end regions). Note that when there is a plurality of positions having the maximum width, the positions refer to the average positions of the portions located outermost in the tire radial direction in the respective regions.

Further, or the disclosed tire, provided that the depth of the sipe is h (mm), the position of the at least one bent portion in the tire radial direction in the center region is preferably 0.05 h to 0.25 h (mm) on the outer side in the tire radial direction than the positions of the at least: one bent portion in the end regions. The above specified range can further improve the wear resistance.

Further, for the disclosed tire, provided that the depth of the sipe is h (mm), the positions of the at least one bent portion in the tire radial direction is preferably displaced to the 0.05 h to 0.25 h (mm) outer side in the tire radial direction in the range from the boundaries of the intermediate regions with the end regions to the boundaries of the intermediate regions with the center region. The above specified range can still further improve the wear resistance.

Further, for the disclosed tire, provided that the depth of the sipe is h (mm), the at least one bent portion preferably extends continuously in the extending direction of the sipe between both ends of the sipe in the range of 30% or more and 55% or less of the depth h (mm) of the sipe in the tire radial direction from the tread surface. The above specified range can effectively improve the wear resistance.

Advantageous Effect

We can provide a tire with improved wear resistance.

DETAILED DESCRIPTION

A pneumatic tire (hereinafter also referred to as a tire) of one of the embodiments will now he demonstrated in detail with reference to the drawings. Note that the internal structure of the tire is no different from that of common pneumatic tires; accordingly, a description thereof will not be given here.

Figure 1:
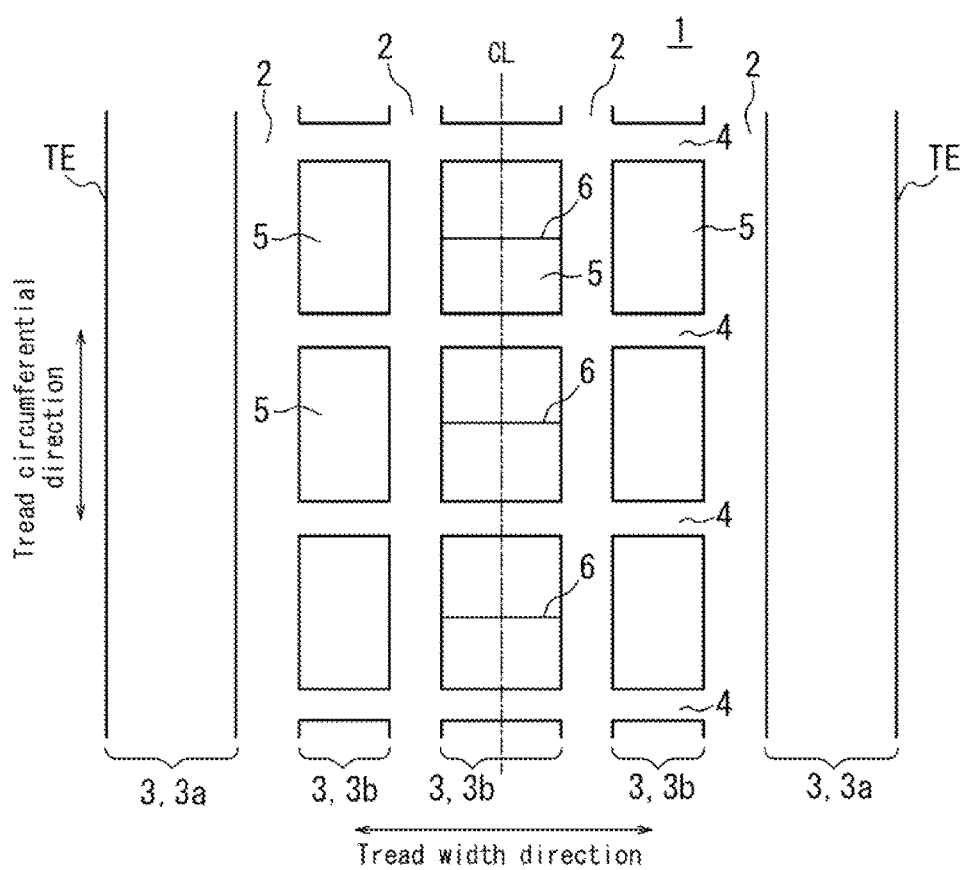
FIG. 1 is a schematic development view showing a tread surface of a tire in accordance with one of the disclosed embodiments.

FIG. 1 is a schematic development view showing a tread surface of a tire according to one of the disclosed embodiments. As shown in FIG. 1, the tire has, in a tread surface 1, one or more (four in the illustrated example) circumferential grooves 2 extending in the tread circumferential direction. A plurality of (five in the illustrated example) land portions 3 are formed by being partitioned by those circumferential grooves 2 or by the circumferential grooves 2 and tread ends TEs. Specifically, in the illustrated example, two land portions 3a located outermost in the tread width direction are rib-like land portions that are continuous in the tread circumferential direction, whereas three lines of land portions 3b that are on the inner side of the land portions 3a in the tread width direction in the illustrated example are partitioned into a plurality of blocks 5 by a plurality of widthwise grooves 4 extending in the tread width direction.

Further, in the example shown in FIG. 1, the tire has sipes 6 extending in the tread width direction in the respective blocks of center land portions 3b placed on the tire equatorial plane CL.

Figure 2:
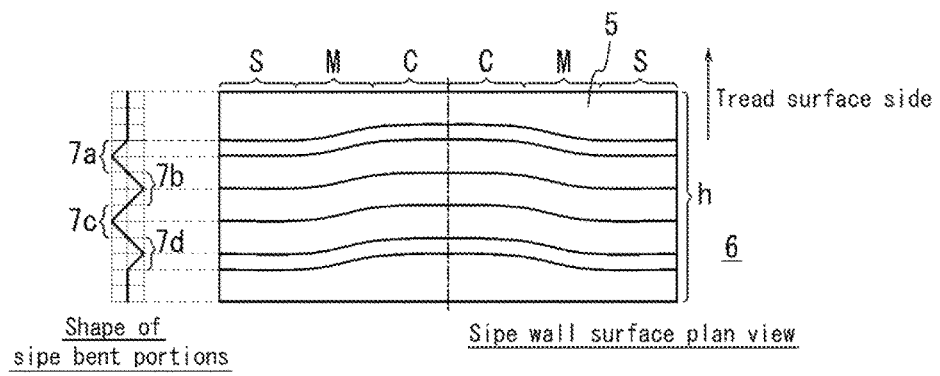
FIG. 2 is a view showing the shape of a sipe.

FIG. 2 is a view, which shows the shape of a sipe showing, in combination, a view of a sipe wall in plan view and a view showing the bent to shape of the sipe at an end of a sipe extension region (this also applies to FIGS. 4(a) to 4(d) and. FIGS. 5(a) to 5(c) for Examples). As shown in FIG. 2, of the area in which the sipe 6 extends, two areas covering ⅙ of the extension length of the sipe 6 from both ends of the sipe 6 are end regions S; two areas covering ⅙ of the extension length of the sipe 6 that are adjacent to the two end regions S are intermediate regions M, and areas covering ⅓ of the extension length of the sipe 6 which are sandwiched between the two intermediate regions M are center regions. Here, the depth of the sine 6 is h (mm). In the illustrated example, the sipe 6 has a substantially constant depth in the extending direction of the sipe 6. As shown in FIG. 2, the sipe 6 has, in the direction of the depth of the sipe 6, at least one bent portion; four bent portions 7a, 7b, 7c, and 7d are shown in the illustration. Note that in the example shown in FIG. 2, the four bent portions 7a, 7b, 7c, and 7d have alternately opposite turns; however, the bent portions may have all turns in the same direction. Here, in the example shown in FIG. 2, the above four bent portions 7a, 7b, 7c, and 7d extend continuously in the extending direction of the sipe 6 from one of the end regions S of the sipe 6 to the other end region S, and the positions of the bent portions in the center regions C are on the outer side in the tire radial direction than the positions thereof in the end regions S. Thus, it is important that the sipe 6 has at least one bent portion, and the bent portion(s) extends continuously in the extending direction of the sipe 6 between the ends of the sipe 6 and the positions of the bent portions in the center regions C are on the outer side in the tire radial direction than the positions thereof in the end regions S. The operation and effect of a tire of this embodiment will be described below.

Figure 3:
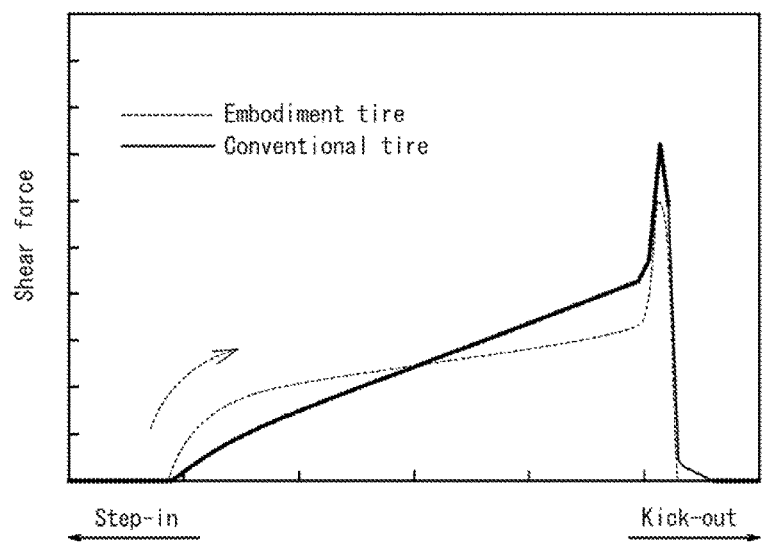
FIG. 3 is a view for showing the operation and effect of a tire in accordance with one of the disclosed embodiments.

In the tire of this embodiment, sipes 6 each having at least one bent portion in the depth direction are provided in land portions such that the positions of the bent portions 7a, 7b, 7c, and 7d of the sipe 6 in the center regions C are on the outer side in the tire radial direction than the positions thereof in the end regions S. Accordingly, in the center region, the sipe walls engage. Thus, as shown in FIG. 3, the shear force at the time of step-in during driving and braking is generated, thereby effectively achieving the effect in reducing the peak of the shear force at the time of kick-out. Meanwhile, in the end regions S, the rigidity of the ends of the land portion (block) can effectively be improved. In other words, in the center regions C that are effective in generating the shear force at the time of step-in, the bent portions are located on the outer side in the tire radial direction so as to effectively reduce the shear force at the time of kick-out, whereas in the end regions S that are effective in improving the rigidity of the land portion (block), the bent portions are located on the inner side in the tire radial direction. Thus, both effects can be achieved. Further, since the bent portions 7a, 7b, 7c, and 7d extend continuously in the extending direction of the sipe 6, the rigidity of the block against side inputs is increased, thereby controlling the wear due to the widthwise inputs. Thus, for the tire of this embodiment, the combination of the effect in generating shear force at the time of step-in and the effect in improving the rigidity of the land portions(s) can improve the wear resistance of the tire.

Specifically, provided that the depth of the sipe 6 is h (mm), the positions of the at least one bent portion in the tire radial direction in the center regions C are preferably located 0.05 h to 0.25 h (mm) on the outer side in the tire radial direction than the positions of the at least one bent portion in the end regions S. The above specified design can improve the wear resistance of the tire by further achieving both the effect in generating a sheer force at the time of step-in and the effect in improving the rigidity of the land to portion(s).

Further, the position of at least one bent portion in the tire radial direction is preferably displaced to the outer 0.05 is to 0.25 h (mm) side in the tire radial direction within the range front the boundaries of the intermediate regions M with the end regions S to the boundaries of the intermediate regions M with the center regions C. The above specified displacement can improve: the wear resistance of the tire by further achieving both the effect in generating a sheer farce at the time of step-in and the effect in improving the rigidity of the land portion(s).

In addition, the at least one bent portion preferably extends continuously in the extending direction of the sipe 6 between the ends of the sipe 6 within the range of 30% or more and 55 % or less of the sipe depth h (mm) in the tire radial direction from the tread surface 1. The above range effectively makes it possible to achieve the effect in reducing a shear force on the land portion(s) (block(s)) at the time of step-in and the effect in improving the rigidity of the land portion(s) (block(s)). Further, in the disclosed tire, the amplitude of the turns of the bent portions is preferably 1.0 mm to 4.0 min. An amplitude of 1.0 mm or more can increase the effect in engaging the sipe walls. Meanwhile, an amplitude of 4.0 mm or less can suppress the damage to the block(s) during the removal of the tire from the mold.

Further, preferably, the land portions 3 are located on the tire equatorial plane CL, and only the land portions 3 that are located on the tire equatorial plane CL have sipes 6. For common tires, the driving force load is high at the center area, and the above structure makes the wear more uniform.

In the above embodiment, the land portions 3 have both rib-like land portions and blocks 5; however, they may have a pattern with only rib-like land portions, or may have a pattern with only blocks. Further, in order to improve the wear resistance the center portion subjected to high contact pressure, blocks 5 obtained by partitioning the land portions 3b located on the tire equatorial plane CL preferably each have one sipe 6 extending in the tread width direction as in the above embodiment (particularly suitable for use in tires for trucks and buses subjected to high loads). Alternatively, of the plurality of land portions 3, at least one land portion 3 may have a sipe 6; for example, only the land portion 3a located outermost in the tread width direction may have the sipe 6.

Further, the sipe(s) 6 preferably extends in the tread width direction or extends at an inclination angle of more than 0° and 60° or less from the tread width direction. With edges due to the sipes in the width direction, the turning performance during wet road driving is improved. On the other hand, when the inclination angle exceeds 60°, the rigidity in the width direction would be reduced.

In addition, the sipes 6 can have bent portions not only in the depth direction of sipes 6 but also in the extending direction of the sines 6. For example, the sipes 6 can extend in a zigzag manner in the extending direction. This can increase the effect in engaging the wall surfaces of the sipes 6, thereby improving the wear resistance.

Further, the depth h (mm) of the sipes 6 is preferably 60% to 90% of the height H (mm) of the land portions where the sipes are formed. A ratio h/H of 60% or more makes it possible to achieve sufficient effects even when the wear develops, whereas a ratio h/H of 90% or less can sufficiently ensure the initial rigidity.

Preferably, when the land portions are rib-like land portions, sipes are arranged at intervals of h to 10 h in the tread circumferential direction, whereas when the land portions are partitioned into blocks, one to three sipes formed in each block. In particular, for a tire for trucks and buses, since the input is high, many sipes make it difficult to ensure rigidity of the tread portion, whereas the number of sipes being excessively small reduces the effect in achieving a great force from the time of step-in.

EXAMPLES

In order to confirm the disclosed effects, tires having so-called three-dimensional sipes in land portions were prepared in accordance with Examples 1 to 8 and Comparative Examples 1 to 3. Comparative Examples 1 to 3 each include a sipe 6' having three bent portions 7a', 7b', 7c', as illustrated in FIGS. 5A-5C. Further, a tire having no sipes was prepared in accordance with Conventional Example. Table 1 shows specifications of each tire. Note that the groove depths of both the circumferential grooves and the widthwise grooves of each tire (the height H of the land portions) were 16 mm, and the sipes had a common depth of 13 mm except for Conventional Example. In Example 4, the sipes were extended with bends having an amplitude of 2 mm not only in the direction of the depth of the sipes but in the extending direction thereof. In Table 1, "displacement amount" means the degree of the outward displacement in the tire radial direction, of the positions of at least one bent portion in the tire radial direction in the center regions C from the positions of the at least one bent portion in the end regions S in the tire radial direction. Further, "displacement ratio" shows the degree of the outward displacement in the tire radial direction, of the position of at least one bent portion in the tire radial direction within the range from the boundaries of the intermediate regions M with the end regions S to the boundaries of the intermediate regions M with the center regions C. In addition, "specified range in the tire radial direction" means the range of 30% or more and 55% or less of the sipe depth in the tire radial direction from the tread surface. The above tires were each subjected to the following test for evaluating the wear resistance.

<Wear Resistance>

The above tires having, a tire size of 275/80R22.5 were each mounted on a rim having a rim size of 8.25×22.5 and the total driving distance causing complete wear was measured at an internal pressure of 900 kPa. The evaluation results are shown in Table 1 Note that in Table 1 the evaluation results are expressed as indices relative to the corresponding driving distance of Conventional Example being "100". Larger indices show better excellent wear resistance.

TABLE 1

Figure 4A:
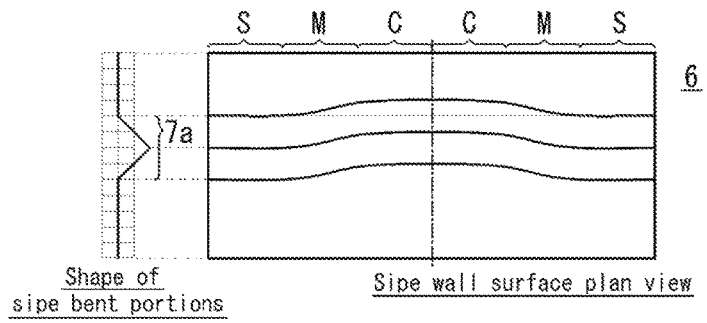
FIGS. 4(a) to 4(d) are views each showing the shape of a sipe of a tire in accordance with an example.
Figure 4B:
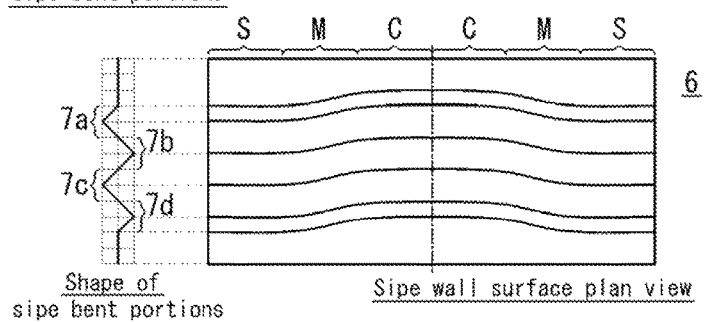
Figure 4C:
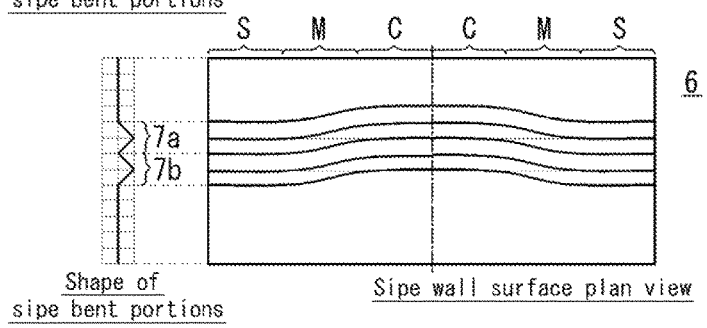
Figure 4D:
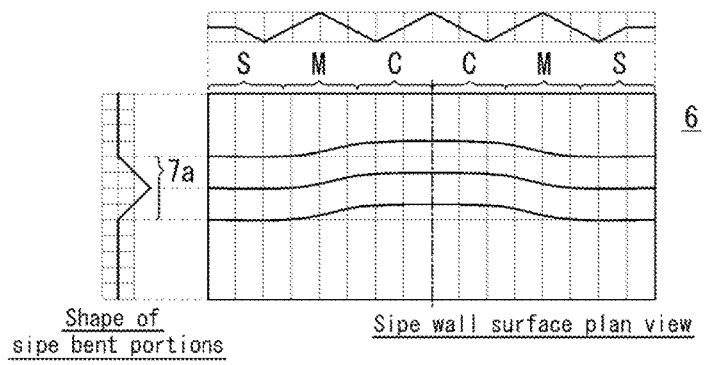
Figure 5A:
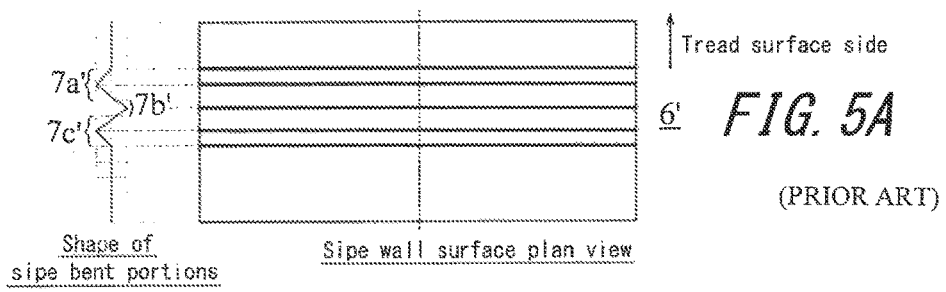
FIGS. 5(a) to 5(c) are views each showing the shape of a sipe of a tire in accordance with a conventional example.
Figure 5B:
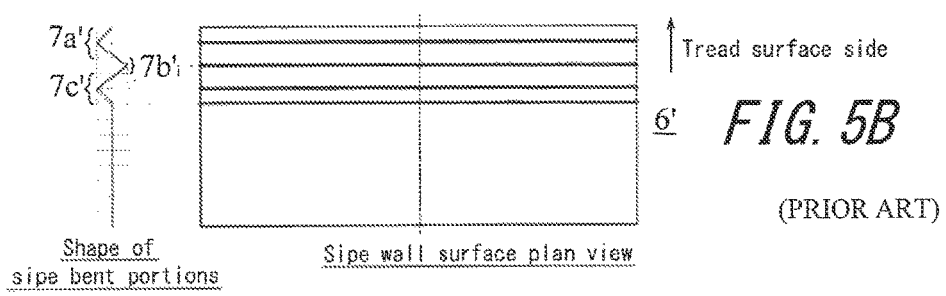
Figure 5C:
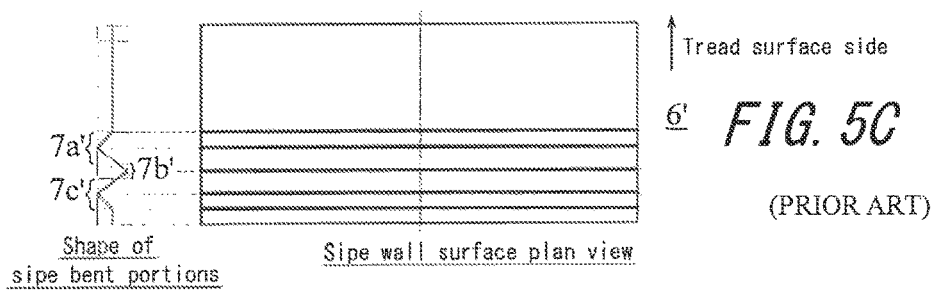

|  | Example 1 | Example 2 | Example 3 | Example 4 | Example 5 | Example 6 | Example 7 | Example 8 | Conventional Example | Comparative Example 1 | Comparative Example 2 | Comparative Example 3 |
|---|---|---|---|---|---|---|---|---|---|---|---|---|
| Tread contact patch | FIG. 1 | FIG. 1 | FIG. 1 | FIG. 1 | FIG. 1 | FIG. 1 | FIG. 1 | FIG. 1 | — | FIG. 1 | FIG. 1 | FIG. 1 |
| Sipe shape | FIG. 4(a) | FIG. 4(b) | FIG. 4(c) | FIG. 4(d) | FIG. 4(e) | FIG. 4(a) | FIG. 4(a) | FIG. 4(a) | No sipe | FIG. 4(a) | FIG. 4(b) | FIG. 4(c) |
| Number of Bent portions | 1 | 4 | 2 | 1 | 1 | 1 | 1 | 1 | — | 3 | 3 | 3 |
| Amplitude of Bent portions | 2 mm | 1 mm | 1 mm | 2 um | 2 mm | 2 mu | 2 um | 2 mm | — | 1 mm | 1 mm | 1 mm |
| Displacement amount (mm) | 1 | 1 | 1 | 1 | 0.5 | 0.65 | 3.25 | 3.5 | — | 0 | 0 | 0 |
| Displacement rate (mm) | 1 | 1 | 1 | 1 | 0.5 | 0.65 | 3.25 | 3.5 | — | 0 | 0 | 0 |

TABLE 1-continued

| | Example 1 | Example 2 | Example 3 | Example 4 | Example 5 | Example 6 | Example 7 | Example 8 | Conventional Example | Comparative Example 1 | Comparative Example 2 | Comparative Example 3 |
|---|---|---|---|---|---|---|---|---|---|---|---|---|
| Number of Bent portions in Specified range in Tire radial direction | 1 | 2 | 2 | 1 | 1 | 1 | 0 | 0 | — | 3 | 1 | 0 |
| Wear resistance index | 110 | 112 | 110 | 110 | 106 | 109 | 107 | 106 | 100 | 101 | 102 | 101 |

As shown in Table 1, the tires in accordance with Examples 1 to 8 are superior in wear resistance to the tires in accordance with Conventional Example and Comparative Examples 1 to 3. Further, comparing Example 1 and Examples 5 to 8, the tires of Examples 1, 6, and 7 with improved "displacement amount" and "displacement ratio" are found to be superior in wear resistance to the tires of Examples 5 and 8.

INDUSTRIAL APPLICABILITY

We can provide a pneumatic tire with improved wear resistance. The disclosed structure is suitable for use in tires for trucks and buses subjected to high loads.

REFERENCE SIGNS LIST

1: Tread surface; 2: Circumferential groove; 3, 3a: 3b: Land portions; 4: Widthwise groove; 5: Block; 6: Sipe; 7a, 7b, 7c: Bent portions; TE: Tread end; CL: Tire equatorial plane

The invention claimed is:

1. A pneumatic tire comprising:
   in a tread surface, a plurality of land portions partitioned by one or more circumferential grooves extending in a tread circumferential direction or by one of the one or more circumferential grooves and one of two tread ends; and
   in at least one land portion of the plurality of land portions, a sipe extending in a tread width direction, of which ends open at the one or more circumferential grooves or the two tread ends,
   wherein provided that of an area in which the sipe extends in the tread width direction, two areas covering ⅙ of an extension length of the sipe from both ends of the sipe are end regions, two areas covering ⅙ of the extension length of the sipe that are adjacent to the two end regions are intermediate regions, and an area covering ⅓ of the extension length of the sipe which is sandwiched between the two intermediate regions is a center region,
   the sipe has at least one pair of bent portions in a depth direction of the sipe respectively on each of both sipe walls, the at least one pair of bent portions respectively engaging with each other and extending continuously in an extending direction of the sipe from one of the end regions of the sipe to the other end region in the tread width direction, without opening to the tread surface across entire lengths of the bent portions;
   each bent portion of the at least one pair of bent portions is located on the outer side in the tire radial direction in the center region relative to the end regions, the at least one pair of bent portions respectively extending continuously in the extending direction of the sipe at a substantially constant depth while in the end regions and the center region, and the at least one pair of bent portions respectively extending continuously in the extending direction of the sipe at a changing depth while in the intermediate region.

2. The pneumatic tire according to claim 1, wherein provided that a depth of the sipe is h (mm),
   positions of the at least one pair of bent portions in the tire radial direction in the center region are 0.05 h to 0.25 h (mm) on the outer side in the tire radial direction relative to positions of the at least one pair of bent portions in the end regions.

3. The pneumatic tire according to claim 1, wherein provided that a depth of the sipe is h (mm),
   positions of the at least one pair of bent portions in the tire radial direction are displaced 0.05 h to 0.25 h (mm) relative to the tread surface to the outer side in the tire radial direction in a range from the boundaries of the intermediate regions with the end regions to the boundaries of the intermediate regions with the center region.

4. The pneumatic tire according to claim 1, wherein provided that a depth of the sipe is h (mm),
   the at least one pair of bent portions extends continuously in the extending direction of the sipe between both ends of the sipe in a range of 30% or more and 55% or less of the depth h (mm) of the sipe in the tire radial direction from the tread surface.

5. The pneumatic tire according to claim 2, wherein provided that a depth of the sipe is h (mm),
   the positions of the at least one pair of bent portions in the tire radial direction are displaced 0.05 h to 0.25 h (mm) relative to the tread surface to the outer side in the tire radial direction in a range from the boundaries of the intermediate regions with the end regions to the boundaries of the intermediate regions with the center region.

6. The pneumatic tire according to claim 2, wherein provided that a depth of the sipe is h (mm),
   the at least one pair of bent portions extends continuously in the extending direction of the sipe between both ends of the sipe in a range of 30% or more and 55% or less of the depth h (mm) of the sipe in the tire radial direction from the tread surface.

7. The pneumatic tire according to claim 3, wherein provided that a depth of the sipe is h (mm),
   the at least one pair of bent portions extends continuously in the extending direction of the sipe between both ends of the sipe in a range of 30% or more and 55% or less of the depth h (mm) of the sipe in the tire radial direction from the tread surface.

8. The pneumatic tire according to claim 5, wherein provided that a depth of the sipe is h (mm), the at least one pair of bent portions extends continuously in the extending direction of the sipe between both ends of the sipe in a range of 30% or more and 55% or less of the depth h (mm) of the sipe in the tire radial direction from the tread surface.

\* \* \* \* \*